US010578847B2

(12) United States Patent
Forrest, Jr.

(10) Patent No.: US 10,578,847 B2
(45) Date of Patent: Mar. 3, 2020

(54) FIBER OPTIC CONNECTION INSPECTION APPARATUS AND METHOD

(71) Applicant: Edward John Forrest, Jr., Marietta, GA (US)

(72) Inventor: Edward John Forrest, Jr., Marietta, GA (US)

(*) Notice: Subject to any disclaimer, the term of this patent is extended or adjusted under 35 U.S.C. 154(b) by 0 days.

(21) Appl. No.: 15/603,874

(22) Filed: May 24, 2017

(65) Prior Publication Data

US 2017/0343783 A1 Nov. 30, 2017

Related U.S. Application Data

(60) Provisional application No. 62/341,472, filed on May 25, 2016.

(51) Int. Cl.
*G02B 21/00* (2006.01)
*G02B 6/38* (2006.01)
*H04N 5/232* (2006.01)
*H04N 5/225* (2006.01)

(52) U.S. Cl.
CPC ......... *G02B 21/0016* (2013.01); *G02B 6/385* (2013.01); *G02B 6/3898* (2013.01); *H04N 5/2252* (2013.01); *H04N 5/23238* (2013.01); *H04N 5/23296* (2013.01)

(58) Field of Classification Search
None
See application file for complete search history.

(56) References Cited

U.S. PATENT DOCUMENTS

| 7,239,788 B2 * | 7/2007 | Villeneuve | G02B 6/3807 385/134 |
| 8,777,844 B1 * | 7/2014 | Sadanand | A61B 1/0055 600/114 |
| 2015/0092043 A1 * | 4/2015 | Baribault | H04N 5/2252 348/125 |
| 2016/0341904 A1 * | 11/2016 | Morin-Drouin | G02B 6/385 |

* cited by examiner

*Primary Examiner* — Michael J Hess
(74) *Attorney, Agent, or Firm* — Sonal Sriyastava

(57) ABSTRACT

A fiber optic connection inspection apparatus and method includes an adapter housing fitted to a video microscope camera configured to observe and records images of a Direct Contact and Expanded Beam fiber optic connector assemblies. The adapter housing is configured to rotatably connect the camera for 360 degree rotation about a longitudinal axis of the adapter housing, assuring inspection of a larger field of view. The field of view represents the three-dimensional nature of the various sectors of a fiber optic connector. The rotation of the camera permits the instrument to visualize the complete connector, enabling the technician to make an informed decision which surfaces to clean to improve signal transmission. The adapter housing may be constructed of soft material that enables camera manipulation to provide a comprehensive view of the optical connector surfaces. The rotating adapter housing may be 3D printed which enables flexibility of design and production.

19 Claims, 5 Drawing Sheets

FIBER OPTIC CONNECTION INSPECTION APPARATUS AND METHOD

CROSS-REFERENCE TO RELATED APPLICATION

This application claims the benefit of priority of U.S. provisional application No. 62/341,472, filed May 25, 2016, the contents of which are herein incorporated by reference.

BACKGROUND OF THE INVENTION

The present invention relates to fiber optic connectors and, more particularly, inspection apparatus and methods for fiber optic connectors.

Existing standards call for 100% video inspection of all fiber optic connections. This is problematic in that existing instruments only "see" a limited surface area of a fiber optic connector, which means that cleaning is often ineffective.

Existing devices range between 100× and 400× magnification and have a field of view limited to a small two-dimensional area of the fiber optic connector. These surfaces are typically considered in designated Zones 1-2-3 or A-B-C-D. As example, such are limited to a small two-dimensional portion of a horizontal surface that can be 250-300 microns of a 2500 micron area and are noted by international standards such as IEC 61300-3-35.

Existing inspection devices for fiber optic connectors are limited to visual inspection of only a small area of a two-dimensional surface of the connector. They are therefore ineffective at being unable to visualize locate, and thereby remove contamination of the connector. The new invention expands existing standard surface viewing to include the complete horizontal surface, greater than the 250-300 micron 'field of view' noted as Zone-4. Zone-5 as considered by this invention adds the third dimension of a 'vertical ferrule' as well as other connector surfaces such as an 'adapter' that connects two fiber connections and an 'alignment sleeve' that assures critical match for error free transmissions.

As can be seen, there is a need for improved fiber optic inspection devices and methods that permit visualization of the complete connector and increase the technician's ability to locate and clean "contamination points" in the connector. These include a total 'horizontal end face ferrule surface', a 'vertical ferrule surface', and other sectors that include 'adapters', 'alignment sleeves', and inter-surfaces heretofore not previously seen in common installation applications.

Heretofore, the only means to observe the three-dimensional nature of contamination was use of an interferometer. The rotating adapter enable digital images of the fiber optic surfaces and combine common video inspection with an interferometer with the result of a 'virtual 3D image of both contamination and connector surfaces and enables accurate photography.

SUMMARY OF THE INVENTION

In one aspect of the present invention, an inspection apparatus for visual inspection of a fiber optic coupling, includes an elongate rotating adapter housing having a camera receiving end and a fiber optic coupling end. A camera is operatively coupled by the rotating adapter to the camera receiving end and rotatable within the camera receiving end about a longitudinal axis of the adapter housing. The camera may have at least one of an optical magnification and a digital magnification. The fiber optic coupling end has an aperture that is configured to receive one or more fiber optic connector types defining the fiber optic coupling.

The rotating adapter housing may have a generally frusto-conical shape. The rotating adapter housing may also include a ball carried in the fiber optic coupling end having an aperture configured to receive the one or more fiber optic connector types, wherein a focal axis of the camera is adjustable relative a longitudinal axis of the fiber optic connector received in the aperture. In some embodiments, the rotating adapter housing may have a fixed focal length. In other embodiments, the rotating adapter housing may have an adjustable bellows formed by a plurality of compressible and extensible annular rings defined along a length of the fiber optic coupling end, wherein a focal length of the camera is adjustable by selective compression and extension of the adjustable bellows. Adjustment may also be created by a screw mechanism which varies the focal length.

In other aspects of the invention, the inspection apparatus may also include a communications interface configured to operatively connect the camera to a computing device. The communications interface may include a wired connection or a wireless connection. In other aspects of the invention, a computing device is operatively connected to the camera and configured to display a field of view captured by the camera. The camera employs an array of LEDs that provide illumination for the capture of still and video images. The LEDs are filtered to reduce LED glare on the fiber optic ferrule. These filters are comprised of laminated theatrical gels and filters. The computing device may be configured to store an image captured in the field of view. The image may be a still digital or motion video image.

Yet other aspects of the invention include a rotating adapter housing for an inspection instrument for visual inspection of a fiber optic coupling with a camera. An elongate rotating adapter housing has a camera end and a fiber optic coupling end, wherein the camera end is configured to receive the camera for rotation about a longitudinal axis of the adapter housing. The fiber optic coupling end has an aperture configured to receive one or more fiber optic connector types defining the fiber optic coupling. The rotating adapter housing may have a frusto-conical shape.

In some embodiments, the rotating adapter housing includes a ball carried in the fiber optic coupling end. The ball having an aperture configured to receive the one or more fiber optic connector types, wherein a focal axis of the camera is adjustable relative a longitudinal axis of the fiber optic connector received in the aperture. The rotating adapter housing may have a fixed focal length. In other embodiments, the rotating adapter housing may have an adjustable bellows formed by a plurality of compressible and extensible annular rings defined along a length of the fiber optic coupling end, wherein a focal length of the camera is adjustable by selective compression and extension of the adjustable bellows. In some embodiments, the extension may be enabled by a screw design that varies the length.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides an improved fiber optic connector inspection apparatus, system and method for visualizing a three dimensional surface of a fiber optic connector surfaces. The ability to see a greater dimension of the fiber optic connection enables the technician to decide to what extent the connector must be cleaned. Heretofore, only a limited area of the connector was considered. With this instrument, understanding the location of contamination allows the technician to discern the cleaning procedure to utilize and helps assure that the connector is properly cleaned. The permits post cleaning and post inspection where contamination can migrate to active "Zone-1" surface if not considered at the time of service, or, in a future time when contamination may migrate and contaminate the active Zone-1 transmission fiber.

Figure 1:
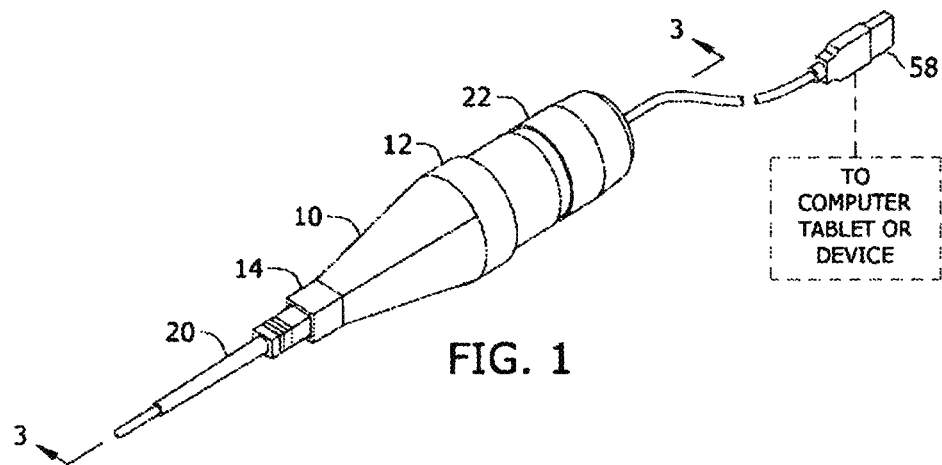
FIG. 1 is a perspective view of an embodiment of a fiber optic inspection device shown in use.

FIG. 1 illustrates an embodiment of a fiber optic connector inspection device according to aspects of the present invention. The device includes an elongate, generally frusto-conical rotating adapter housing 10 having a camera receiving end 12 and a fiber optic coupling end 14. A camera 22, which is preferably a modified USB digital camera, is carried in or is attachable to the camera receiving end 12.

The camera 22 may be operatively coupled to a computing device via a communications interface cable 58, such as a universal serial bus (USB) connector, fire wire, or lightning connector. Alternatively, the camera 22 may be connected to the computing device via a wireless connection. Preferably, the camera 22 is connected to a computing device that, with associated software, is operable for the display, capture, and storage of the optical signals received on the camera 22. By way of non-limiting example the camera 22 may be connected to a PC, a tablet, or a smart phone so that the technician may view the connector 20 on site while servicing or inspecting the connector 20.

The camera 22 is received in the camera end 12 of the rotating adapter housing 10 so that the camera 22 may be rotated a full 360 degrees within the camera end 12 and thereby permit viewing and record images around the entire connector 20. The camera 22 may include an illumination lamp proximal to a lens of the camera to illuminate the fiber optic connection 20. The illumination lamp may include an array of LEDs that provide illumination for the capture of still and video images. The LEDs may be filtered to reduce LED glare on the fiber optic ferrule. The inspection device is operable via manipulation of the camera end 12 of the device to obtain a 360 degree view of the fiber optic connection interface. By rotating the camera 22 around an longitudinal axis of the adapter 10, 24, 36, 46 the images may be taken through various planes and parallax to observe the complete surface of the connector 20.

Preferably, the camera 22 is configured for magnification to permit close inspection of the fiber optic connector 20. The magnification may include one or more of an optical or digital magnification of the optical signals received by the camera 22. Preferably, the magnification is configured to provide up to 1000× magnification to allow the technician to clearly identify and determine the presence of contamination in all types of the fiber optic connections 20. The camera 22 may also include a non-transient storage media to store one or more digital images and video images that may be captured by the camera 22.

One or more optical filters 16, 18 may be interposed between the camera receiving end 12 and the camera 22. The optical filters 16, 18 are formed of a selected material to eliminate glare on the 'horizontal zone' as received by the LEDS on the camera 22. The glare blocking filters are nominal 10 mil translucent plastic. The glare reflective materials are metallic coated plastic, with perforations that are formed in the surface of the filter 16,18. The filters may be formed as a laminated assembly of glare-blocking translucent material 16 and coated-metallic and perforated glare reflecting materials 18. By way of non-limiting example, the filter 16 may be formed of a theatrical gel, material, such as model number Solaris DS 416, manufactured by PSC of Bronderslev, Denmark. The filter 18 may be formed of a metallic diffusion material, such as model number e-Colour 186, by ROSCO Laboratories of Stamford, Conn., USA.

The fiber optic coupling end 14 is configured for attachment to a fiber optic coupling 20 that is attached to an end of a fiber optic cable that requires inspection or servicing. As seen in reference to FIGS. 2-10, the fiber optic coupling end 14, 28, 40, 52 of the rotating adapter 10, 24, 36, 46 may be configured in a variety of arrangements corresponding to one or more of a plurality of fiber optic coupling types.

Figure 2:
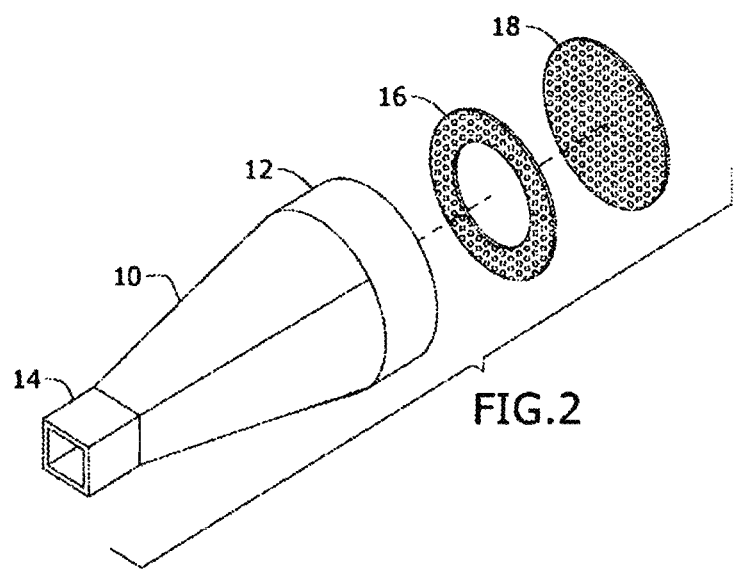
FIG. 2 is an exploded view of an embodiment of a rotating adapter housing for the fiber optic inspection device.
Figure 3:
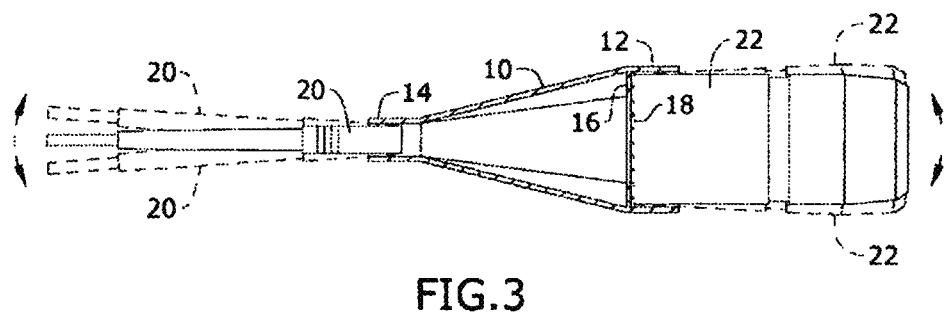
FIG. 3 is a section view of the fiber optic inspection device taken from 3-3 in FIG. 1.
Figure 4:
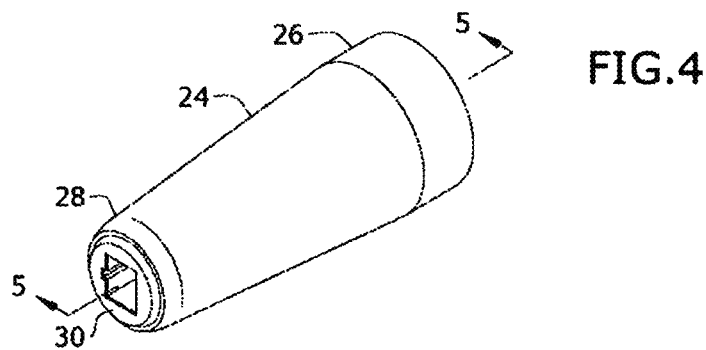
FIG. 4 is a perspective view of an alternate embodiment of a rotating adapter housing.
Figure 5:
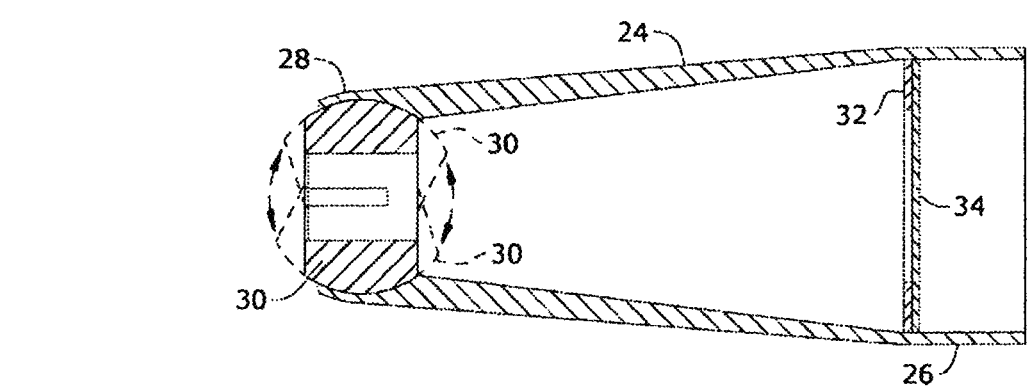
FIG. 5 is a section view of the invention taken from 5-5 in FIG. 4.

In the embodiment of the adapter housing 10 shown in FIG. 2, the fiber optic coupling end 14 may be configured to receive direct fit plug in of the fiber optic coupling 20. As will be appreciated, the fiber optic coupling 20 may be formed in a wide variety of shapes and sizes, depending upon the application and manufacture. In the embodiment of the adapter housing 24 shown in reference to FIGS. 4 and 5, the adapter housing 24 includes a camera end 26 and fiber optic coupling end 28 having a rotating ball 30 carried in the end 28. One or more filters 32, 34 may be received in the camera end 26 of the adapter 24 to be interposed between the camera 22 and the connection 20. The ball 30 allows the technician to tilt the focal axis of the camera 22 relative an axis of the to the fiber optic connector 20, while the camera 22 may be rotated in the camera end 26.

Figure 6:
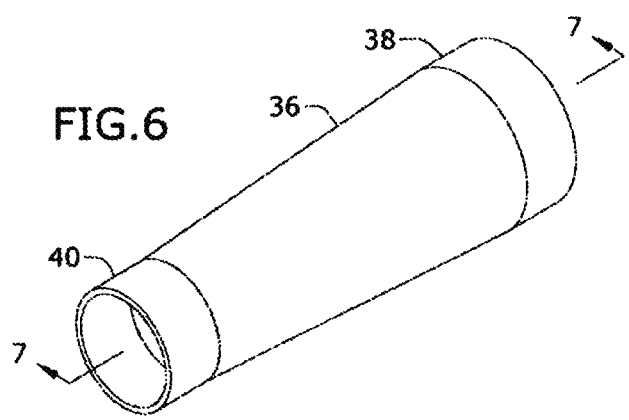
FIG. 6 is a perspective view of an alternate fixed focal length rotating adapter housing.
Figure 7:
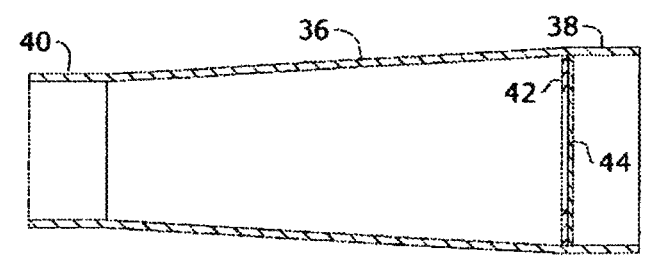
FIG. 7 is a section view of the fixed focal length rotating adapter housing taken from 7-7 in FIG. 6.

In the embodiment shown in reference to FIGS. 6 and 7, the adapter housing 36 includes a camera end 38 and may receive one or more optical filters 42, 38. The fiber optic coupling end 40 is formed as a substantially cylindrical portion that may surround a fiber optic connector 20 and positions the camera 22 at a fixed focal length relative the connector 20.

Figure 8:
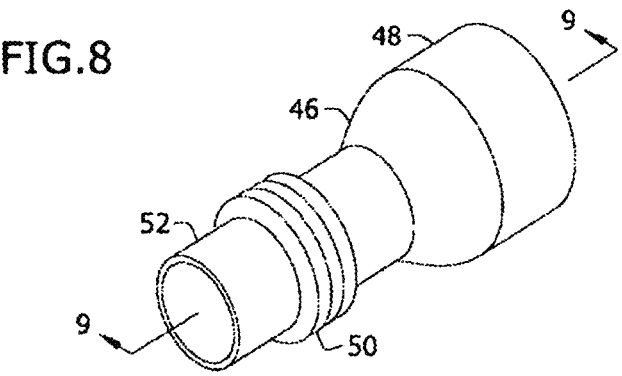
FIG. 8 is a perspective view of an adjustable focal length rotating adapter housing (illustrating bellows 50 compressed).
Figure 9:
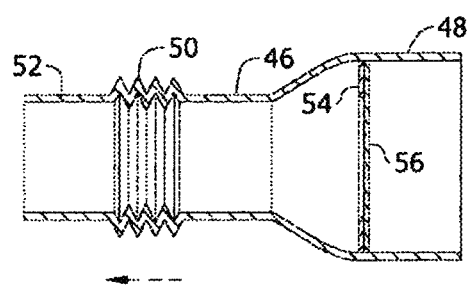
FIG. 9 is a section view of the adjustable focal length rotating adapter housing taken from 9-9 in FIG. 8.
Figure 10:
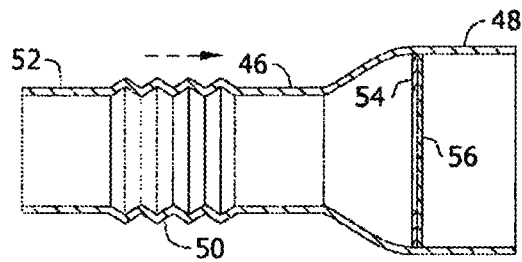
FIG. 10 is a section view illustrating bellows 50 in an expanded condition.

A variable focal length adapter housing 46 is shown in reference to FIGS. 8-10. The variable focal length adapter housing 46 has a camera end 48, which may receive one or more optical filters 54, 56 interposed between the camera 22 and the connector 20. The fiber optic coupling end 52 includes an adjustable bellows 50, formed by a plurality of compressible and extensible annular rings 50 along a length of the fiber optic coupling end 52. The adjustable bellows 50 permit the technician to vary the focal length between the camera 22 and the fiber optic coupling 20 undergoing inspection.

As shown and described, the inspection instrument expands the surface area and views that may be obtained with the camera 22 in three dimensions. The camera 22 of the instrument permits the technician to record in both still and motion video. The instrument provides the ability to see a connector and all the surfaces and provide a direct digital image in virtual 3D. Heretofore, the only way to see even a small portion of surface contamination was to use an interferometer.

Figure 11:
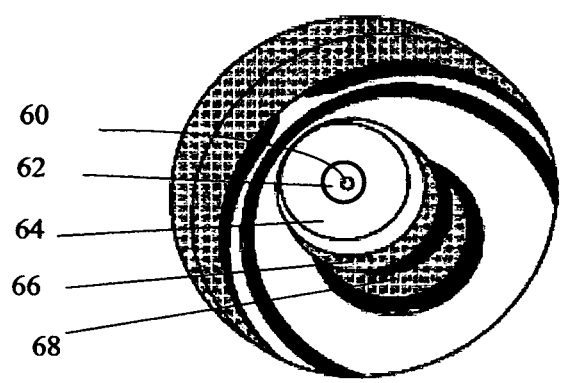
FIG. 11 is a virtual three-dimensional view of a common fiber optic connector as produced by the present invention.

FIG. 11 is a virtual three-dimensional view of a common fiber optic connector as produced by the present invention. The invention enables digital photography of not only the standard end face (Zone-1-2-3/A-B-C-D) i.e. 60, 62 and 64 but also the total horizontal surface Zone-4 (66) and Zone-5 (68). The present invention enables to view and clean the contamination points and debris Zone 1 (60), Zone 2 (62), Zone 3 (64), Zone 4 (66), and Zone 5 (68).

Figure 12:
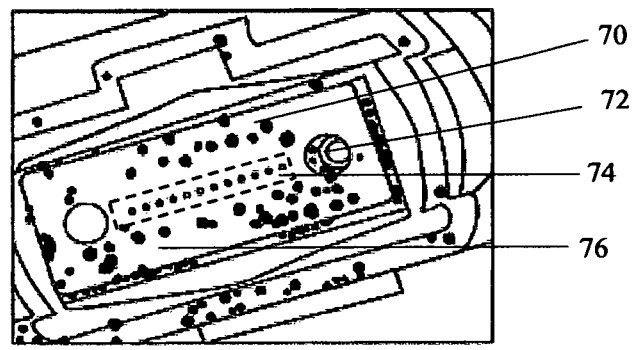
FIG. 12 is a virtual three-dimensional view of an MT-Type connector as produced by the present invention.

Similarly, FIG. 12 is a virtual three-dimensional view of an MT-Type connector as produced by the present invention. 70 denote debris that is located between the alignment ports (holes) 72, near transmission fiber (74) and on the inter-surfaces (76). Such debris impacted area causes misalignment as well as signal loss. The present invention enables to view and clean the contamination points and debris (70) located between the alignment ports (holes) 72, near transmission fiber (74) and on the inter-surfaces (76).

Figure 13:
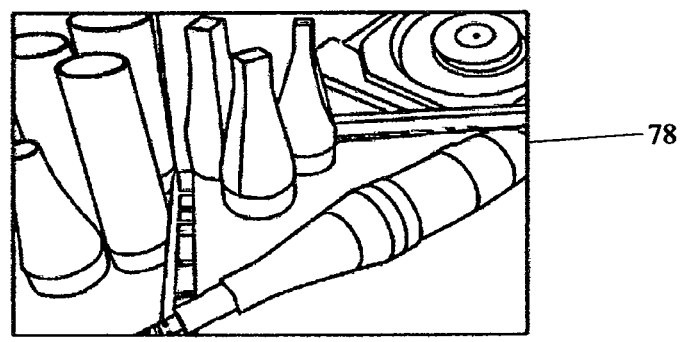
FIG. 13 is a set-up of the present invention.

FIG. 13 is a set-up of the present invention. The set-up (78) shows the device arrangement in accordance with an embodiment of the present invention.

Figure 14:
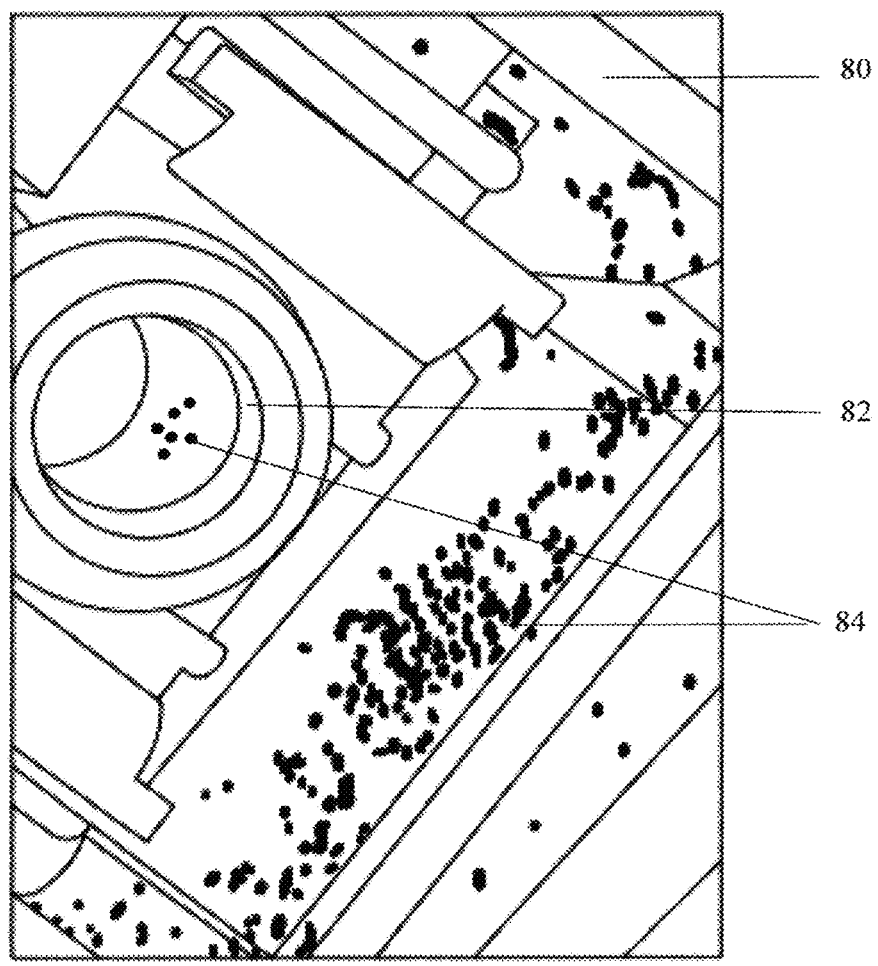
FIG. 14 is a virtual three-dimensional view of an adapter and an alignment sleeve as produced by the present invention.

FIG. 14 is a virtual three-dimensional view of an adapter and an alignment sleeve as produced by the present invention. The adapter (80) connects one or more fiber optic jumper cables. However, at the time of connection, debris on an alignment sleeve (82) and debris (84) on the adapter can be a source of cross-contamination on fiber optic end face surfaces. The present invention and the set-up (78) help is viewing and cleaning such debris to avoid cross contamination and signal losses.

The inspection device may be used in a wide range of environments, including FTTh (Fiber to the Home), FTTb (Fiber to the business), Data Centers, various military aviation and DOD applications as well as commercial aviation, security, entertainment, and traffic control operations.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:
1. An inspection apparatus for visual inspection of a fiber optic connection surfaces, comprising:
   an elongate rotating adapter housing having a camera receiving end and a fiber optic coupling end;
   a camera, coupled to the camera receiving end about a longitudinal axis of the rotating adapter housing, the camera having at least one of an optical magnification and a digital magnification; and
   the fiber optic coupling end having an aperture configured to receive one or more fiber optic connector types defining the fiber optic coupling,
   wherein the rotating adapter housing further comprises a rotating ball carried in the fiber optic coupling end having the aperture configured to receive the one or more fiber optic connector types, wherein a focal axis of the camera is adjustable relative the longitudinal axis of the fiber optic connector received in the aperture of the fiber optic coupling using the rotating ball;
   wherein the rotating adapter housing has a frusto-conical shape.

2. The inspection apparatus of claim 1, wherein the camera is a digital photographic camera.

3. The inspection apparatus of claim 2, wherein the rotating adapter housing is configured to rotatably connect the camera for 360 degree rotation about the longitudinal axis of the rotating adapter housing.

4. The inspection apparatus of claim 2, wherein the rotating adapter housing has a fixed focal length.

5. The inspection apparatus of claim 1, wherein the rotating adapter housing further comprises:
an adjustable bellows formed by a plurality of compressible and extensible annular rings defined along a length of the fiber optic coupling end, wherein a focal length of the camera is adjustable by selective compression and extension of the adjustable bellows.

6. The inspection apparatus of claim 1, wherein the rotating adapter housing further comprises:
a communications interface configured to operatively connect the camera to a computing device.

7. The inspection apparatus of claim 6, wherein the communications interface includes a wired connection.

8. The inspection apparatus of claim 6, wherein the communications interface includes a wireless connection.

9. The inspection apparatus of claim 1, further comprising:
a computing device operatively connected to the camera and configured to display a field of view captured by the camera.

10. The inspection apparatus of claim 9, wherein the computing device is configured to store an image captured in the field of view.

11. The inspection apparatus of claim 10, wherein the image is a digital video image.

12. A rotating adapter housing for an inspection instrument for visual inspection of a fiber optic coupling with a camera, comprising:
an elongate adapter housing having a camera end and a fiber optic coupling end, wherein the camera end is configured to receive the camera for rotation about a longitudinal axis of the adapter housing; and
the fiber optic coupling end having an aperture configured to receive one or more fiber optic connector types defining the fiber optic coupling, wherein the rotating adapter housing further comprises a rotating ball carried in the fiber optic coupling end having an aperture configured to receive the one or more fiber optic connector types, wherein a focal axis of the camera is adjustable relative the longitudinal axis of the fiber optic connector received in the aperture of the fiber optic coupling using the rotating ball.

13. The rotating adapter housing of claim 12, wherein the camera is a digital photographic camera.

14. The rotating adapter housing of claim 12, wherein the rotating adapter housing is configured to rotatably connect the camera for 360 degree rotation about the longitudinal axis of the rotating adapter housing.

15. The rotating adapter housing of claim 12, wherein the adapter housing has a fixed focal length and has a frusto-conical shape.

16. The rotating adapter housing of claim 12, wherein the adapter housing further comprises:
an adjustable bellows formed by a plurality of compressible and extensible annular rings defined along a length of the fiber optic coupling end, wherein a focal length of the camera is adjustable by selective compression and extension of the adjustable bellows.

17. A method of inspecting a fiber optic connection, comprising:
providing an inspection apparatus, comprising:
a rotating adapter housing having a camera receiving end and a fiber optic coupling end;
a camera coupled to the camera receiving end and rotatable within the camera receiving end about a longitudinal axis of the rotating adapter housing, the camera having at least one of an optical magnification and a digital magnification; and
an aperture in the fiber optic coupling end configured to receive one or more fiber optic connector types defining the fiber optic coupling, wherein the rotating adapter housing comprises a rotating ball carried in the fiber optic coupling end having an aperture configured to receive the one or more fiber optic connector types, wherein a focal axis of the camera is adjustable relative the longitudinal axis of the fiber optic connector received in the aperture of the fiber optic coupling using the rotating ball;
inserting the fiber optic connection in the aperture; and
recording one or more images of the fiber optic connection with the camera.

18. The method of claim 17, further comprising:
rotating the camera about the longitudinal axis of the rotating adapter housing; and
recording a plurality of images of the fiber optic connection from a plurality of rotation angles about the longitudinal axis.

19. The method of claim 18, wherein the plurality of images comprises a video of the fiber optic connection.

* * * * *